US008719428B2

(12) United States Patent
Seo

(10) Patent No.: US 8,719,428 B2
(45) Date of Patent: May 6, 2014

(54) SESSION ESTABLISHMENT METHOD USING GATEWAY SERVER AND PHONE IDENTIFICATION

(75) Inventor: Hyungsu Seo, Yangpyeong (KR)

(73) Assignee: Rsupport Co., Ltd., Seoul (KR)

( * ) Notice: Subject to any disclaimer, the term of this patent is extended or adjusted under 35 U.S.C. 154(b) by 122 days.

(21) Appl. No.: 13/029,909

(22) Filed: Feb. 17, 2011

(65) Prior Publication Data

US 2012/0005355 A1 Jan. 5, 2012

(30) Foreign Application Priority Data

Jul. 2, 2010 (KR) .................... 10-2010-0063903

(51) Int. Cl.
*G06F 15/16* (2006.01)
(52) U.S. Cl.
USPC .......................................... 709/228; 370/356
(58) Field of Classification Search
USPC .......................................... 709/228; 370/356
See application file for complete search history.

(56) References Cited

U.S. PATENT DOCUMENTS

| | | | | |
|---|---|---|---|---|
| 5,771,353 A * | 6/1998 | Eggleston et al. | ............ | 709/227 |
| 6,215,784 B1 * | 4/2001 | Petras et al. | .................. | 370/356 |
| 7,801,289 B2 * | 9/2010 | Adamczyk et al. | ...... | 379/201.01 |
| 7,936,865 B2 * | 5/2011 | Brunson et al. | .......... | 379/215.01 |
| 8,477,758 B2 * | 7/2013 | Kafka et al. | .................. | 370/352 |
| 2006/0068704 A1 * | 3/2006 | Bhakta et al. | ................ | 455/41.2 |
| 2007/0156804 A1 * | 7/2007 | Mo | ............................. | 709/200 |
| 2010/0114822 A1 * | 5/2010 | Pollock et al. | ................ | 707/623 |

FOREIGN PATENT DOCUMENTS

KR 10-2003-0049533 A 6/2003
KR 10-2004-0085539 A 10/2004

* cited by examiner

*Primary Examiner* — Thomas Dailey
(74) *Attorney, Agent, or Firm* — Edwards Wildman Palmer LLP

(57) ABSTRACT

Disclosed is a method of establishing a session between a mobile communication terminal and a computer linked to the Internet via a gateway server therebetween through WAP or TCP/IP by using identification information of the mobile communication terminal as a connection key to transmit/receive data packets. Consequently, stable and accurate data communication between the mobile communication terminal and the computer linked to the Internet can be achieved.

2 Claims, 5 Drawing Sheets

US 8,719,428 B2

SESSION ESTABLISHMENT METHOD USING GATEWAY SERVER AND PHONE IDENTIFICATION

CROSS-REFERENCE TO RELATED APPLICATION

This application claims under 35 U.S.C. §119(a) the benefit of Korean Application No. 10-2010-0063903 filed Jul. 2, 2010, the entire contents of which are incorporated herein by reference.

BACKGROUND OF THE DISCLOSURE

1. Technical Field

The present disclosure relates to a method of establishing a session between a mobile communication terminal (i.e., a mobile station of a mobile communication network) and a computer linked to the Internet.

2. Background Art

In the past, communication was generally based on voice call or short message With the recent development of mobile communication technology, communication pattern has been diversified. For example, Internet access through a mobile communication network based on a communication protocol such as WAP has been made available. Furthermore, with the recent rapid increase in a data processing rate through a mobile communication network and development of a smart phone, which includes an input/output device such a high-definition touch screen as well as a large-capacity control operating device and memory, TCP/IP based Internet access has become possible through a wireless LAN, thereby enabling Internet communication through a mobile communication terminal to be prevalent.

Internet communications can be realized through a mobile communication terminal in various methods including the following two methods. First, it can be realized by having an access to a web page on the Internet through a mobile communication terminal. According to this method, internet communications can be relatively easily performed by executing a browser installed in a mobile communication terminal like a web page access through a conventional desktop computer or laptop computer. Second, it can be realized by connecting a mobile communication terminal to a specific computer linked to the Internet and transmitting/receiving data between the mobile communication terminal and the specific computer. In this method, unlike the first method, a session is required to be opened among a mobile communication network or wireless LAN, a gateway server and the specific computer linked to the Internet based on a prior arrangement between the mobile communication terminal and the specific computer through a complicated process, which causes users' inconveniences.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method of establishing a session via a gateway server between a mobile communication terminal which is a mobile station of a mobile communication network and a service server linked to the Internet.

In one embodiment of the present invention, the method comprises the steps of: executing an interface manager connected to the service server; transmitting by the interface manager identification information of the mobile communication terminal to the gateway server through the Internet; setting by the gateway server the identification information of the mobile communication terminal as a connection key; executing an access application of the mobile communication terminal; extracting by the access application the identification information of the mobile communication terminal; transmitting by the access application the identification information of the mobile communication terminal to the gateway server through a wireless network; and transmitting by the gateway server data packets between the service server and the mobile communication terminal by using the identification information of the mobile communication terminal as a connection key.

In another embodiment, the method comprises the steps of: executing a CRM server connected to a PSTN and an interface manager connected to the service server; calling, by the mobile communication terminal, the CRM server through the PSTN; reading by the CRM server the phone number of the mobile communication terminal; searching an identification information database for identification information of the mobile communication terminal by using the phone number of the mobile communication terminal and transmitting the identification information to the gateway server through the Internet, by the interface manager; setting by the gateway server the identification information of the mobile communication terminal as a connection key; executing an access application of the mobile communication terminal; extracting by the access application the identification information of the mobile communication terminal; transmitting by the access application the identification information of the mobile communication terminal to the gateway server through a wireless network; and transmitting by the gateway server data packets between the service server and the mobile communication terminal by using the identification information of the mobile communication terminal as a connection key.

In another aspect, the present invention provides a system for carrying out the method.

According to the present invention, stable and accurate data communication between a mobile communication terminal and a computer linked to the Internet can be achieved without having to perform complicated operation. Accordingly, it is possible to provide efficient and stable data communication services in various forms for the mobile communication network, wireless LAN and the Internet, such as data transmission between the mobile communication terminal and the computer linked to the Internet and remote control of the mobile communication terminal through the computer linked to the Internet.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF EMBODIMENTS

Figure 1:
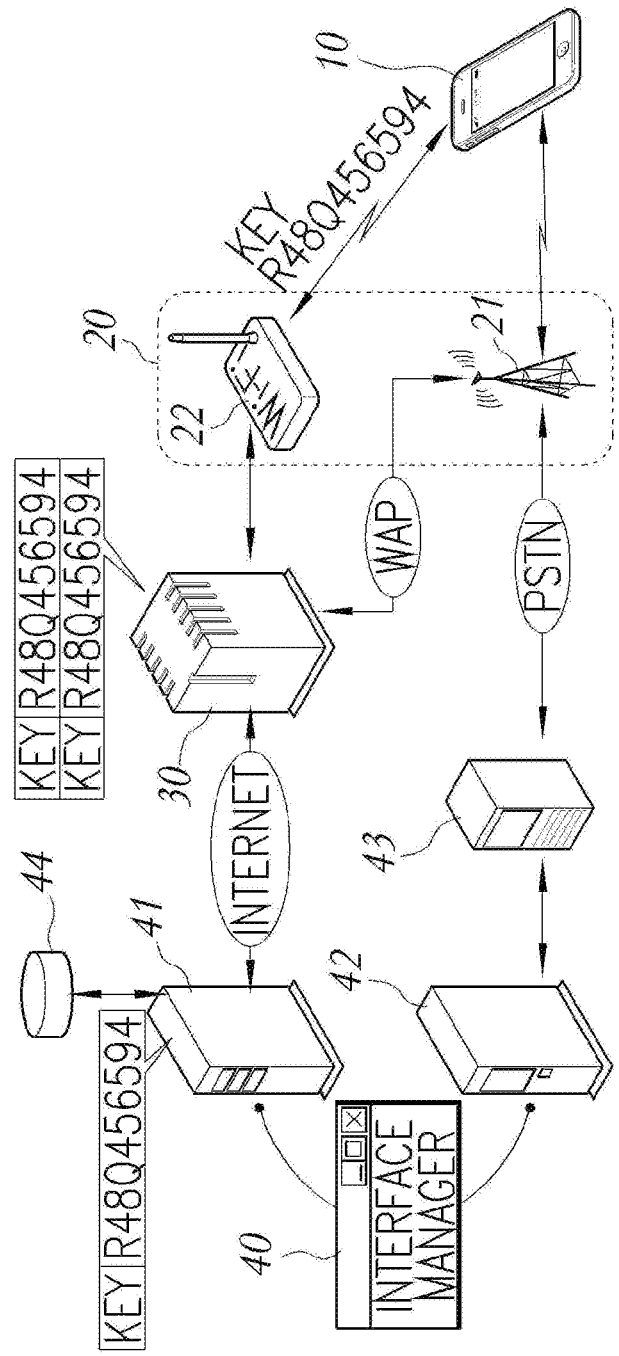
FIG. 1 illustrates components of a communication system for carrying out a session establishment method according to an embodiment of the present invention and communication states of the components.

FIG. 1 illustrates components of a communication system for carrying out a session establishment method according to an embodiment of the present invention and communication states of the components.

Referring to FIG. 1, the session establishment method according to an embodiment of the present invention is performed by a system comprising, as major elements, a mobile communication terminal 10, a gateway server 30, a mobile communication network and a wireless LAN 22 linked to the gateway server 30, a service server 41 linked to the gateway server 30 through the internet and connected to an identification information database 44, and an interface manager 40 connected to the service server 41 to transmit/receive data to/from the gateway server 30.

The service server 41, a computer connected to the gateway server 30 through the Internet, does not necessarily operate as a server and may operate as a client when linked to the mobile communication terminal 10.

The interface manager 40 is a program that transmits/receives data to/from the gateway server 30. Connection of the interface manager 40 to the service server 41 means direct installation of the interface manager 40 in the service server 41 or installation of the interface manager 40 in a separate computer corresponding to a terminal connected to the service server 41. When a plurality of counselor computers are connected to a server operated by a common carrier or an Internet information provider to provide services to a plurality of mobile communication terminal users, installation of the interface manager 40 in a terminal can refer to installation of the interface manager 40 in each counselor computer.

The identification information database 44 stores phone numbers and electronic serial numbers of mobile communication terminals when a common carrier or an Internet information provider provides services according to the present invention to mobile communication terminal users. The identification information database 44 may additionally store personal information of the mobile communication terminal users and operate in connection with a CRM server 42 which will be described later.

The identification information of the mobile communication terminal 10, stored in the identification information database 44, is used as a connection key when a session is established. The identification information of the mobile communication terminal 10 refers to information having uniqueness, such as user identification information recorded in a subscriber identity module (SIM) chip or a memory in the mobile communication terminal 10 as well as the phone number and electronic serial number of the mobile communication terminal 10.

The mobile communication terminal 10 is linked to the gateway server 30 through Wireless Application Protocol (WAP) based communication using the mobile communication network 21 such as Time Division Multiple Access (TDMA) and Code Division Multiple Access (CDMA) or Transport Control Protocol/Internet Protocol (TCP/IP) based communication through the wireless LAN 22 such as Wi-Fi and WiBro. An access application, a program that transmits/receives data to/from the gateway server 30 and extracts the identification information of the mobile communication terminal 10, such as the phone number and electronic serial number of the mobile communication terminal 10, is installed in the mobile communication terminal 10.

Referring to FIG. 1, the communication system further includes a private branch exchange (PBX) 43 connected to a public switched telephone network (PSTN) and the CRM server 42. The CRM server 42 is connected to the interface manager 40 such that the phone number of the mobile communication terminal 10, read by the CRM server 42, can be inputted to the interface manager 40.

Figure 2:
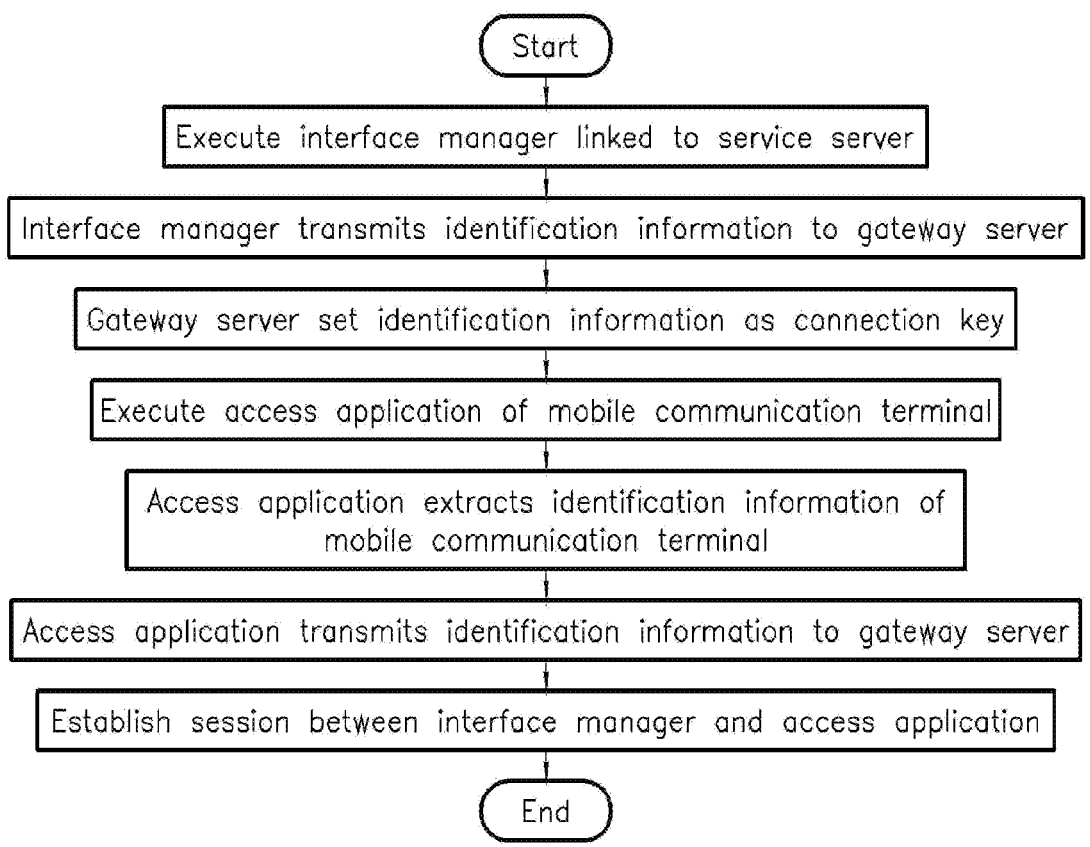
FIG. 2 is a flowchart illustrating a session establishment method according to an embodiment of the present invention.

FIG. 2 is a flowchart illustrating a session establishment method that can be carried out by the above-described system.

The interface manager 40 connected to the service server 41, that is, directly installed in the service server 41 or installed in a computer corresponding to a terminal connected to the service server 41 is executed.

The interface manager 40 is a program that transmits/receives data to/from the mobile communication terminal via the gateway server 30 and can be configured of an independent program or a module of a follow-up processing program that is to be executed after a session is established, such as a remote control program.

When the interface manager 40 transmits the identification information of the mobile communication terminal 10 for which a session will be established to the gateway server 30, the gateway server 30 establishes the session using the identification information as the connection key.

In the establishment of a session between the mobile communication terminal 10 and a computer linked to the Internet, the identification information of the mobile communication terminal 10, that is, the phone number or electronic serial number, is used to obtain the following advantages.

The call number, that is, phone number, given to the mobile communication terminal 10 is a unique number and the electronic serial number of the mobile communication terminal 10 is also a unique number, and thus stability and accuracy in the operation of the session can be secured.

Furthermore, since the identification information of the mobile communication terminal 10 can be easily read by the firm ware or application of the mobile communication terminal 10, the identification information can be read and transmitted by the application installed in the mobile communication terminal 10 without requiring the user to input a connection key composed of a complicated numeral string or a character string. This can minimize the user's operation of the mobile communication terminal 10 during the session establishment process.

The identification information of the mobile communication terminal 10 can be obtained in such a manner that the identification information database 44 is searched for the identification information of the mobile communication terminal 10 based on the personal information of the user of the mobile communication terminal 10, which is to be acquired during a call from the user of the mobile communication terminal 100. Otherwise, the identification information of the mobile communication terminal 10 can be obtained by reading the phone number corresponding to the mobile communication terminal 10 in the process of receiving a call from the mobile communication terminal 10 through caller identification display (CID) service or the PBX 43 and the CRM server 42 and searching the identification information database 44 based on the read phone number.

Meanwhile, the access application installed in the mobile communication terminal 10 is executed. The access application is a program that transmits/receives data to/from the gateway server 30 and extracts the identification information of the mobile communication terminal 10, such as the phone number and electronic serial number, and performs an operation similar to that of the interface manager 40 of the service server 41.

The access application extracts the identification information of the mobile communication terminal 10, and then transmits the identification information to the gateway server 30 through the wireless network 20. The gateway server 30 receives the identification information of the mobile communication terminal 10, establishes a session using the identification information as a connection key and transmits data packets between the service server 41 and the mobile communication terminal 10.

The wireless network 20 refers to a wireless communication network through which data communication between the gateway server 30 and the mobile communication terminal 10 can be performed. Preferably, it may be a WAP based communication network through the mobile communication network 21 such as TDMA and CDMA or a TCP/IP based communication network through the wireless LAN 22 such as Wi-Fi and WiBro, as shown in FIG. 1.

Accordingly, if the mobile communication terminal 10 capable of being directly connected to the wireless LAN 22, such as a smart phone, is located in the coverage area of the wireless LAN 22, it is efficient to connect the mobile communication network 10 with the gateway server 30 through the wireless LAN 22.

Figure 3:
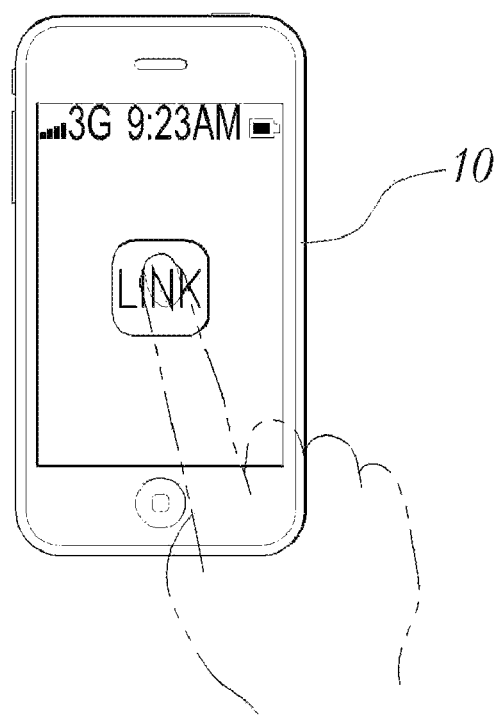
FIG. 3 illustrates an exemplary screen of a mobile communication terminal.

In the establishment of the session between the service server 41 on the Internet and the mobile communication terminal 10 on the wireless network 20 via the gateway server 30, the identification information of the mobile communication terminal 10 is used as the connection key and the access application installed in the mobile communication terminal 10 extracts the identification information of the mobile communication terminal 10 and transmits/receives data, and thus the user can be linked to the remote service server 41 by a simple operation (e.g., one-touch click), as shown in FIG. 3, without having to perform a complicated input/operating process.

Figure 4:
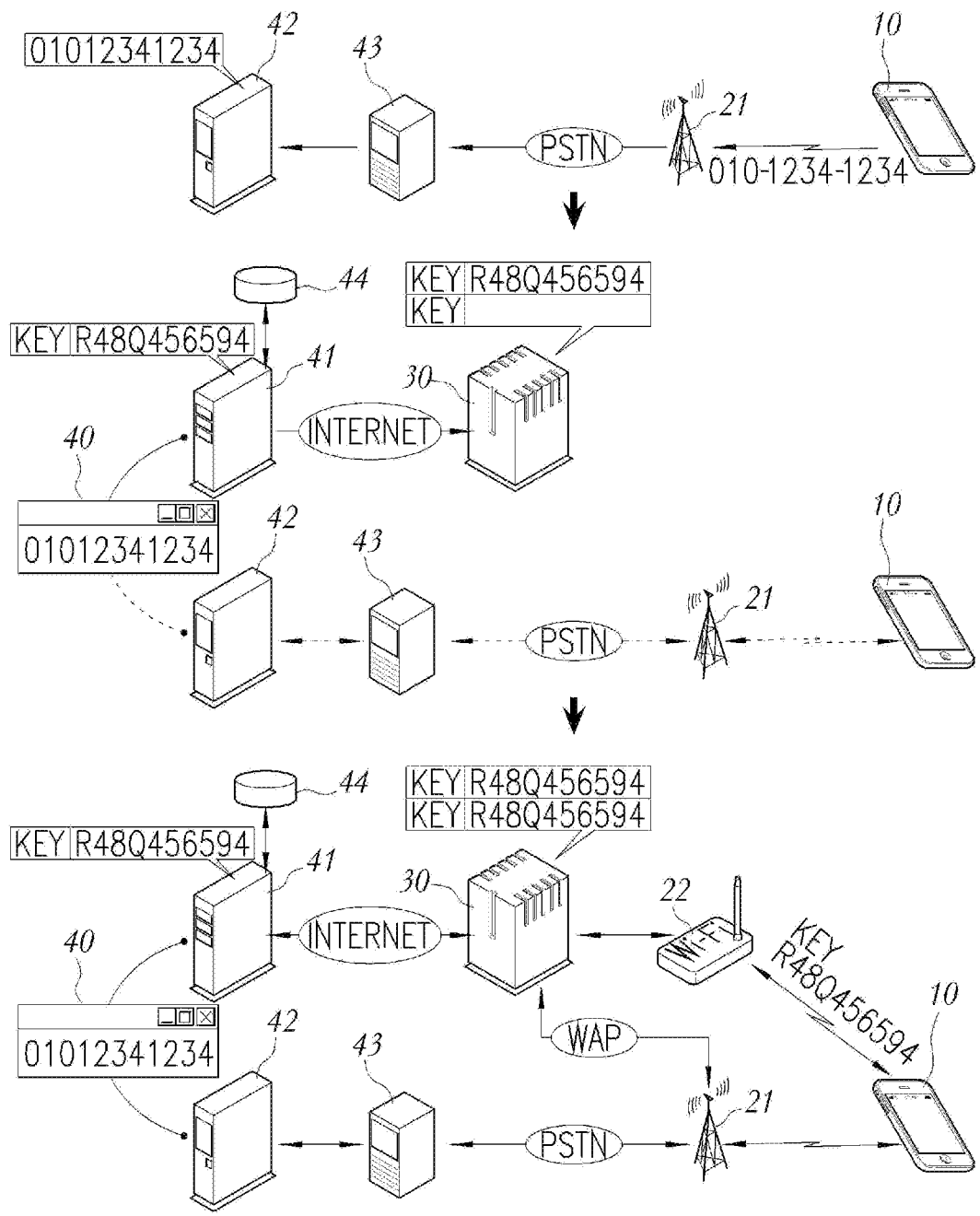
FIG. 4 illustrates respective communication states of a session establishment method according to another embodiment of the present invention, to which a customer relationship management (CRM) server is applied.
Figure 5:
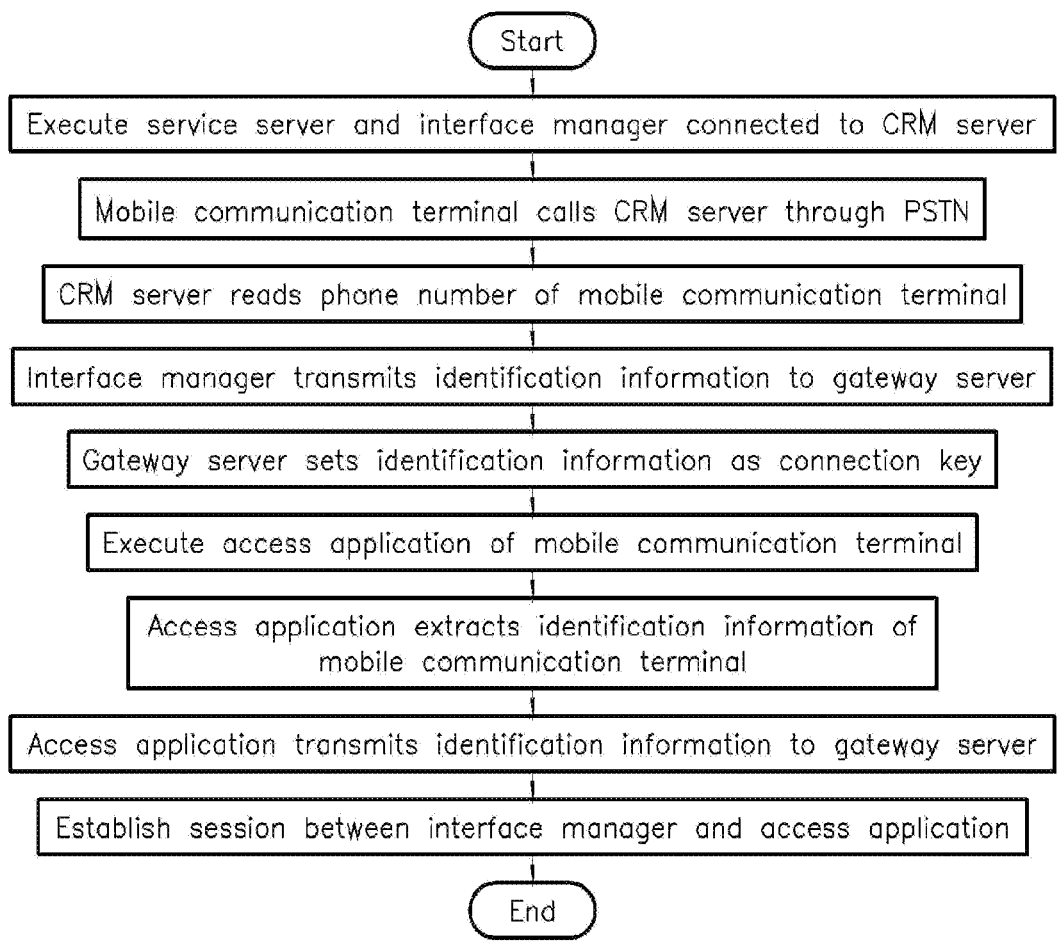
FIG. 5 is a flowchart illustrating the session establishment method according to another embodiment of the processes shown in FIG. 4.

FIGS. 4 and 5 illustrate a session establishment method according to another embodiment of the invention, which connects the CRM server 42 linked to the PSTN with the interface manager 40, extracts the phone number corresponding to the mobile communication terminal 10 in the process of calling the CRM server 42 of the mobile communication terminal 10, and inputs the phone number so as to establish a session without having to obtain the phone number of the mobile communication terminal 10 or the personal information of the user of the mobile communication terminal 10 in advance.

This embodiment to which the CRM server 42 is applied is based on a premise that the session establishment method of the present invention is performed by a common carrier or an Internet information provider having mobile communication terminal users as customers. Typically, a plurality of counselor computers are connected as terminals to the service server 41 of the common carrier or Internet information provider, and a plurality of voice communication lines connected to PSTN are secured and connected to the CRM server 42 through the PBX 43.

When the user of the mobile communication terminal 10 calls a call center of the common carrier or Internet information provider, the mobile communication terminal 10 calls the CRM server 42 through the mobile communication network 21 and the PSTN. The CRM server 42 extracts the phone number of the mobile communication terminal 10 in cooperation with the PBX 43 and connects the mobile communication terminal 10 to a counselor on call.

FIG. 4 illustrates respective communication states of a session establishment method according to this embodiment of the present invention.

The mobile communication terminal 10 calls the CRM server 42 through the mobile communication network 21 and the PSTN. The interface manager 40 is linked to the CRM server 42 to receive the phone number of the mobile communication terminal 10 from the CRM server 42. Though FIG. 4 shows that the service server 41 and the CRM server 42 are separated from each other, the service server 41 and the CRM server 42 are not required to be physically separated from each other and both the service server 41 and the CRM server 42 can be mounted in single server equipment.

The interface manager 40, which has obtained the phone number of the mobile communication terminal 10 from the CRM server 42, extracts the identification information of the mobile communication terminal 10 from the identification information database 44 and transmits the identification information to the gateway server 30 and the access application of the mobile communication terminal 10 transmits the same identification information to the gateway server 30 to establish the session between the mobile communication terminal 10 and the gateway server 30, as shown in the lower part of FIG. 4.

FIG. 5 is a flowchart illustrating the session establishment method according to the embodiment shown in FIG. 4.

The interface manager 40 connected to the service server 41 and the CRM server 42 (i.e., installed in a computer (terminal) connected to the service server 41 and the CRM server 42 or directly installed in the service server 41 and the CRM server 42 or in an integrated server of the service server 41 and the CRM server 42) is executed.

When the mobile communication terminal 10 calls the CRM server 42 through the mobile communication network 21 and the PSTN, the CRM server 42 reads the phone number of the mobile communication terminal 10 and inputs the read phone number to the interface manager 40. The interface manager 40 searches the identification information database 44 for the identification information of the mobile communication terminal 10 and transmits the identification information to the gateway server 30. Then, the session between the mobile communication terminal 10 and the service server 41 is established through the same process as that shown in FIG. 2.

With this embodiment, the common carrier or Internet information provider can provide remote control services to users who are not accustomed to using the mobile communication terminal 10 and accessing the Internet.

That is, when the mobile communication terminal 10 calls the call center of the common carrier or Internet information provider, the CRM server 42 extracts the phone number of the mobile communication terminal 10 and inputs the phone number to the interface manager 40. The interface manager 40 extracts identification information corresponding to the mobile communication terminal 10 from the identification information database 44 and transmits the identification information to the gateway server 30 as a connection key. Then, when a counselor instructs the user of the mobile communication terminal 10 to execute the access application through a one-touch operation, as shown in FIG. 3, a session between the mobile communication terminal 10 and the service server 41 is established without having to have the user of the mobile communication terminal 10 perform complicated inputting and operating processes.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of establishing a session via a gateway server between a mobile communication terminal which is a mobile station of a mobile communication network and a service server linked to the Internet, the method comprising:
  executing an interface manager connected to the service server (41);
  transmitting by the interface manager identification information of the mobile communication terminal to the gateway server through the Internet, wherein the identification information is a phone number and electronic serial number of the mobile communication device;
  setting automatically by the gateway server the phone number and electronic serial number of the mobile communication terminal as a connection key to prevent a user from having to input a connection key on the mobile communication terminal;
  executing an access application of the mobile communication terminal;
  extracting by the access application the identification information of the mobile communication terminal;
  transmitting by the access application the identification information of the mobile communication terminal to the gateway server through a wireless network; and
  transmitting by the gateway server data packets between the service server and the mobile communication terminal by using the identification information of the mobile communication terminal as a connection key.

2. A method of establishing a session via a gateway server between a mobile communication terminal which is a mobile station of a mobile communication network and a service server linked to the Internet, the method comprising:
  executing a customer relationship management (CRM) server connected to a public switched telephone network (PSTN) and an interface manager connected to the service server;
  calling, by the mobile communication terminal, the CRM server through the PSTN;
  reading by the CRM server the phone number of the mobile communication terminal;
  searching an identification information database for identification information of the mobile communication terminal by using the phone number of the mobile communication terminal and transmitting the identification information to the gateway server through the Internet, by the interface manager, wherein the identification information is a phone number and electronic serial number of the mobile communication device;
  setting automatically by the gateway server the phone number and electronic serial number of the mobile communication terminal as a connection key to prevent a user from having to input a connection key on the mobile communication terminal;
  executing an access application of the mobile communication terminal;
  extracting by the access application the identification information of the mobile communication terminal;
  transmitting by the access application the identification information of the mobile communication terminal to the gateway server through a wireless network; and
  transmitting by the gateway server data packets between the service server and the mobile communication terminal by using the identification information of the mobile communication terminal as a connection key.

\* \* \* \* \*